(12) United States Patent
Hsu et al.

(10) Patent No.: US 12,450,205 B1
(45) Date of Patent: Oct. 21, 2025

(54) TUNER CODEWORD DATABASE CONSTRUCTION METHOD AND MOBILE DEVICE

(71) Applicant: MEDIATEK Inc., Hsinchu (TW)

(72) Inventors: Chin-Wei Hsu, Hsinchu (TW);
Chun-Hsiang Chen, Hsinchu (TW);
Sin-Sheng Wong, Hsinchu (TW);
Po-Chung Hsiao, Hsinchu (TW);
Yen-Liang Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/641,609

(22) Filed: Apr. 22, 2024

(51) Int. Cl.
*G06F 16/21* (2019.01)
*H04B 17/00* (2015.01)

(52) U.S. Cl.
CPC ........... *G06F 16/211* (2019.01); *H04B 17/00* (2013.01)

(58) Field of Classification Search
CPC .............................. G06F 16/211; H04B 17/00
USPC ......................................................... 707/748
See application file for complete search history.

(56) References Cited

U.S. PATENT DOCUMENTS

| | | | |
|---|---|---|---|
| 6,317,604 B1 * | 11/2001 | Kovach, Jr. | G01S 5/021 455/456.5 |
| 8,204,446 B2 | 6/2012 | Scheer et al. | |
| 2008/0188237 A1 * | 8/2008 | Alles | G01S 5/02526 455/456.1 |
| 2017/0272108 A1 * | 9/2017 | Filipovic | H04B 1/0458 |
| 2021/0311166 A1 * | 10/2021 | Wu | G01S 13/003 |
| 2024/0204813 A1 * | 6/2024 | Jayaraj | H04B 1/16 |

FOREIGN PATENT DOCUMENTS

WO   2017165210 A1   9/2017

* cited by examiner

*Primary Examiner* — Kuen S Lu
(74) *Attorney, Agent, or Firm* — McClure, Qualey & Rodack, LLP

(57) ABSTRACT

The application provides a tuner codeword database construction method and a mobile device. A plurality of mobile device configuration parameters are obtained. Tuner characteristic measurement is performed on one or more testing mobile devices based on the plurality of mobile device configuration parameters to generate a plurality of tuner characteristic data. Tuner codeword selection is performed on the plurality of tuner characteristic data based on a predetermined weighting and a filtering range to generate a target tuner codeword among a plurality of tuner codewords. The target tuner codeword is stored in a tuner codeword database, the tuner codeword database storing a plurality of stored tuner codewords for controlling at least one tuner of a user mobile device.

4 Claims, 7 Drawing Sheets

TUNER CODEWORD DATABASE CONSTRUCTION METHOD AND MOBILE DEVICE

TECHNICAL FIELD

The disclosure relates in general to a tuner codeword database construction method and a mobile device.

BACKGROUND

Mainly driven by consumer preferences, wireless handheld communication devices are continuously decreasing in physical size while expanding in the number of features they offer. Moreover, modern wireless devices are engineered to support communication across multiple frequency bands, thus impacting the design and performance of their antenna systems.

Traditionally, wireless devices featured externally protruding antennas, but many current models integrate antennas within the device's housing, thereby occupying internal space. The ongoing trend towards smaller devices imposes constraints on available space for antenna systems. Additionally, some devices supporting multiple frequency bands or communication protocols require multiple antennas, further challenging the limited space within the device.

The compact design of many modern wireless devices means users often hold them in ways that can interfere with antenna performance. For instance, gripping the device or pressing it against the face during use can disrupt the antenna's radiation efficiency, affecting its ability to transmit or receive signals effectively.

Recent advancements include the integration of impedance matching circuits, enabling the development of compact antenna systems capable of reliable communication across multiple frequency bands. These circuits adjust the antenna's impedance to match the desired operating frequency.

Antenna selection (AS) and antenna tuning (AT) are crucial for improving wireless communication performance. Unified control of the antenna switch network (SN) and antenna tuner is essential. However, a single antenna tuner codeword can only cover a limited frequency range, leading to performance trade-offs between different Tx/Rx frequency bands in multi-band CA. To mitigate these trade-offs, an adaptive antenna tuner codeword selection algorithm is introduced, allowing optimization based on user-defined weightings for different scenarios. Priority can be given to improving signal bands of interest while constraining degradation in other bands.

Also, boosting performance across multiple transmission and reception (Tx/Rx) bands simultaneously with a single tuner codeword presents challenges due to limitations in antenna and tuner design. Using one tuner codeword may significantly enhance performance on one component carrier (CC) while adversely affecting others. Traditionally, constructing the antenna tuner codeword database has been a manual and time-consuming process, lacking efficiency. Thus, the application proposes a methodology for constructing the antenna tuner codeword database under various conditions. The antenna tuner codeword database encompasses settings for each tuner set, each SN status, different environmental conditions (such as channel characteristics like Signal-to-noise ratio (SNR), Power headroom (PHR), Reference signal received power (RSRP), Voltage standing wave ratio (VSWR) measurements), and user scenarios, among other factors.

To address these issues, an adaptive tuner selection algorithm is proposed in the application, particularly tailored for multi-band carrier aggregation (CA) scenarios. This adaptive tuner selection algorithm optimizes the construction of the tuner codeword database under varying conditions.

SUMMARY

According to one embodiment, a tuner codeword database construction method is provided. The tuner codeword database construction method comprises: obtaining a plurality of mobile device configuration parameters; performing tuner characteristic measurement on one or more testing mobile devices based on the plurality of mobile device configuration parameters to generate a plurality of tuner characteristic data; performing tuner codeword selection on the plurality of tuner characteristic data based on a predetermined weighting and a filtering range to generate a target tuner codeword among a plurality of tuner codewords; and storing the target tuner codeword in a tuner codeword database, the tuner codeword database storing a plurality of stored tuner codewords for controlling at least one tuner of a user mobile device.

According to another embodiment, a mobile device is provided. The mobile device comprises: an antenna control; a tuner codeword database coupled to the antenna control; a plurality of tuner sets coupled to the antenna control; and a plurality of antennas coupled to the tuner sets. The tuner codeword database is established by the following steps: obtaining a plurality of mobile device configuration parameters; performing tuner characteristic measurement on one or more testing mobile devices based on the plurality of mobile device configuration parameters to generate a plurality of tuner characteristic data; performing tuner codeword selection on the plurality of tuner characteristic data based on a predetermined weighting and a filtering range to generate a target tuner codeword among a plurality of tuner codewords; and storing the target tuner codeword in a tuner codeword database, the tuner codeword database storing a plurality of stored tuner codewords for controlling at least one tuner of a user mobile device.

According to one embodiment, a tuner codeword database construction method is provided. The tuner codeword database construction method comprises: collecting characteristic data among several testing mobile devices; determining a target tuner codeword by filtering and selecting among a plurality of tuner codes; and storing the target tuner codeword in a tuner codeword database, the tuner codeword database storing a plurality of stored tuner codewords for controlling at least one tuner of a user mobile device. The step of filtering and selecting among the plurality of tuner codes including: defining an indicator function based on the characteristic data; pre-processing and filtering the plurality of tuner codes based on a user-defined weighting; defining a determination function based on the user-defined weighting and the indicator function for selecting among a plurality of filtered tuner codewords; and determining the target tuner codeword based on a plurality of determination function results.

Figure 1:
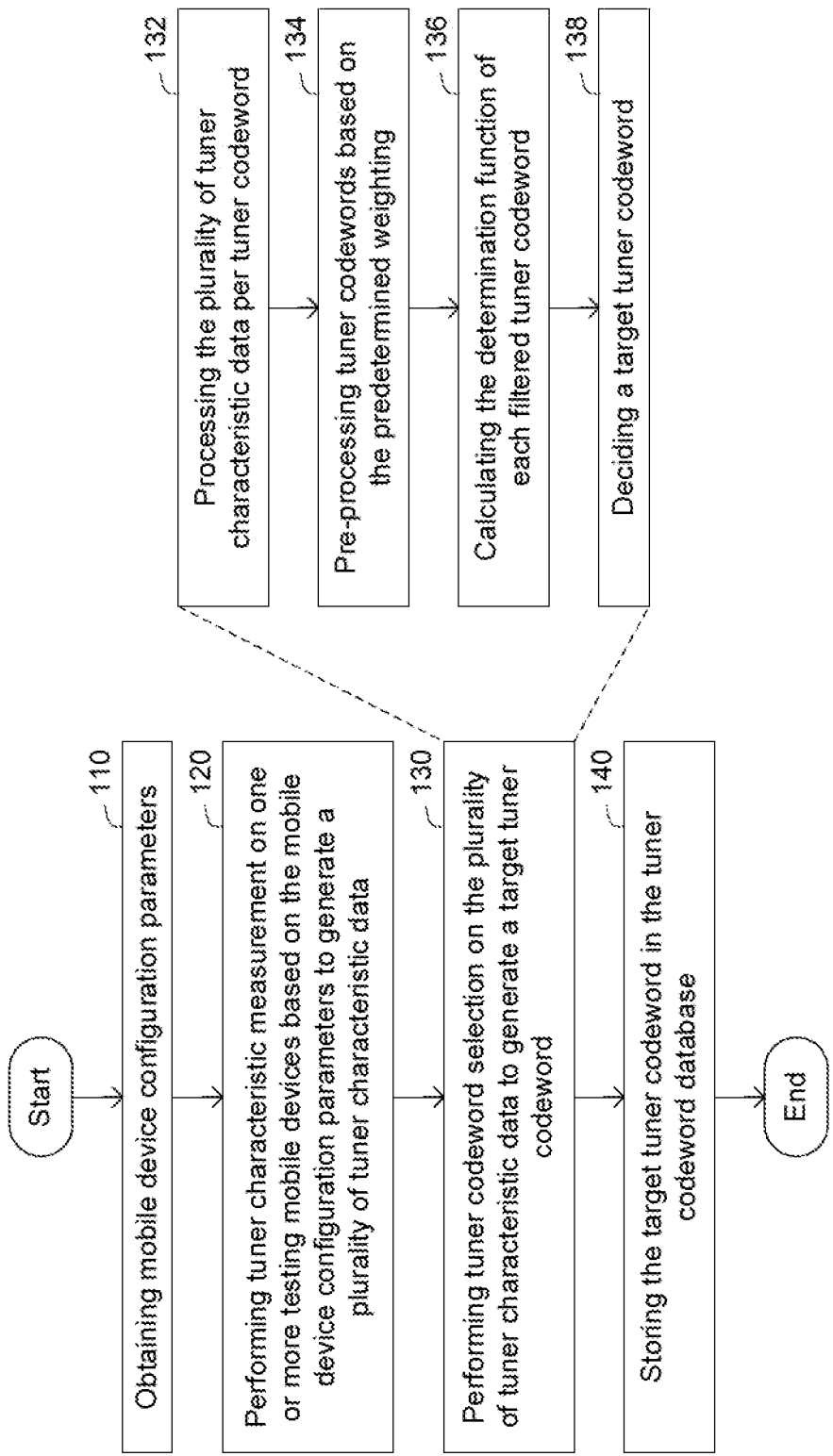
FIG. 1 shows a flow for tuner codeword database construction method according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a flow for tuner codeword database construction method according to one embodiment of the application. In one embodiment of the application, the tuner codeword database construction method may be implemented for example but not limited by, a computing system (for example, a computer, a server, a notebook computer).

In step 110, mobile device configuration parameters are obtained. The mobile device configuration parameters include for example but not limited by, Radio frequency front-end (REFE) configuration parameters, Carrier aggregation (CA) combination parameters, a tuner code list and etc. In one embodiment of the application, the mobile device may be for example but not limited by, a smart phone.

In step 120, tuner characteristic measurement is performed on one or more testing mobile devices based on the mobile device configuration parameters to generate a plurality of tuner characteristic data. In one embodiment of the application, the tuner characteristic data may be for example but not limited by, transmitting power (Tx power), Voltage standing wave ratio (VSWR) and so on.

In step 130, tuner codeword selection is performed on the plurality of tuner characteristic data generated in step 120 to generate a target tuner codeword.

In step 140, the target tuner codeword is stored in the tuner codeword database.

In one embodiment of the application, step 130 of FIG. 1 has more detailed sub-steps. Step 130 includes sub-steps 132-138, which is not to limit the application.

In sub-step 132, the plurality of tuner characteristic data (generated in step 120) per tuner codeword are processed. For example, in sub-step 132, the tuner characteristic data is processed as an indicator for tuner codeword selection, which can be defined as the indicator function of the pre-measured tuner characteristic data for each signal band such as signal power, SNR, voltage standing wave ratio (VSWR), reflection coefficient and so on. For example but not limited by, the indicator function of the pre-measured tuner characteristic data for each signal band (i-th transmission band or i-th receiving band, wherein "i" is a band number) may be presented as: $F_i$ (Tx power, RSRP, SNR, VSWR, . . . ).

In sub-step 134, tuner codewords are pre-processed based on the predetermined weighting. For example but not limited by, in sub-step 134, the tuner codewords are filtered based on the predetermined weighting of each transmission band and/or each receiving band.

In sub-step 136, the determination function of each filtered tuner codeword is calculated. For example but not limited by, in sub-step 136, the determination function of each filtered tuner codeword is calculated, wherein the determination function may be defined as a function of the defined weighting and other indicators. For example, the cost of each filtered codeword is used as the determination function. Cost of each filtered codeword may be presented as: $\text{cost}=\Sigma w_i \times F_i$ (Tx power, RSRP, SNR, VSWR, . . . ), wherein $w_i$ represents the predetermined weighting of the i-th transmission band or the i-th receiving band.

In sub-step 138, a target tuner codeword is decided and stored in the tuner codeword database. For example, the target (optimal) tuner codeword is selected based on the calculated determination function. For example but not limited by, a tuner codeword having lowest cost is selected as the target (optimal) tuner codeword.

Figure 2A:
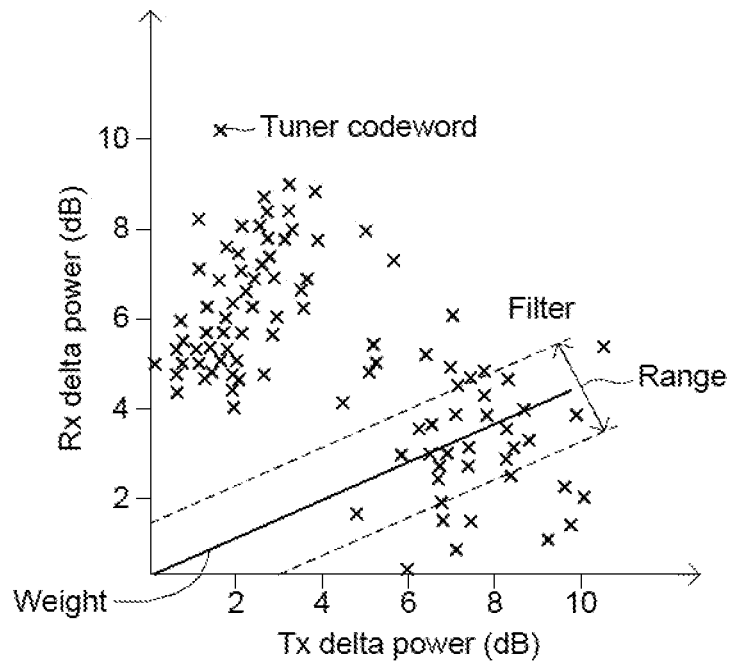
FIG. 2A and FIG. 2B show an example of target codeword selection according to one embodiment of the application.
Figure 2B:
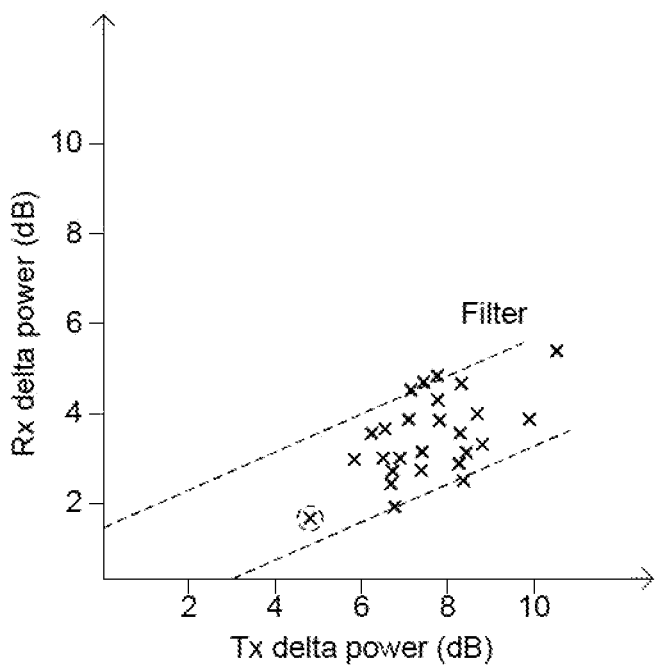

FIG. 2A and FIG. 2B show an example of target codeword selection according to one embodiment of the application.

In one embodiment of the application, the sub-step 132 may be implemented by: calculating the delta power per tuner codeword for each signal band, wherein the delta power is defined as the power difference from the maximal power of all the tuner codewords.

In one embodiment of the application, the sub-step 134 may be implemented by filtering the tuner codewords based on the predetermined weighting of each transmission band and/or each receiving band, to prevent selecting too unbalanced tuner codewords. For example, when the predetermined weighting is Tx_Δ_W: Rx_Δ_W=2:1, then a codeword featured by a close ratio of Tx delta power (Tx_Δ): Rx delta power (Rx_Δ) is found.

In one embodiment of the application, the sub-step 136 may be implemented by calculating the cost function of each filtered tuner codeword is based on the Tx/Rx delta power and the corresponding weighting for each signal band.

In one embodiment of the application, the sub-step 138 may be implemented by selecting the tuner codeword with the minimal cost.

In FIG. 2A, a plurality of tuner codes are shown. FIG. 2A also shows a predetermined weight and the filtering range. The filtering range is corresponding to the predetermined weight. FIG. 2B shows the filtering result of the codewords. As shown in FIG. 2B, the codewords outside the filtering range are filtered. In one embodiment of the application, the filtering range may be adjusted according to the standard deviation, or variance of the statistics and so on.

Figure 3A:
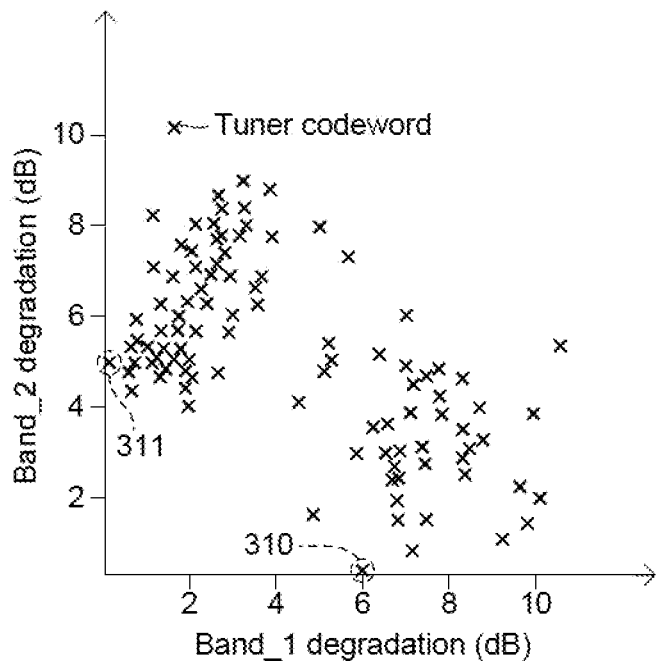
FIG. 3A (prior art) and FIG. 3B shows example without codeword filtering and with codeword filtering, respectively.
Figure 3B:
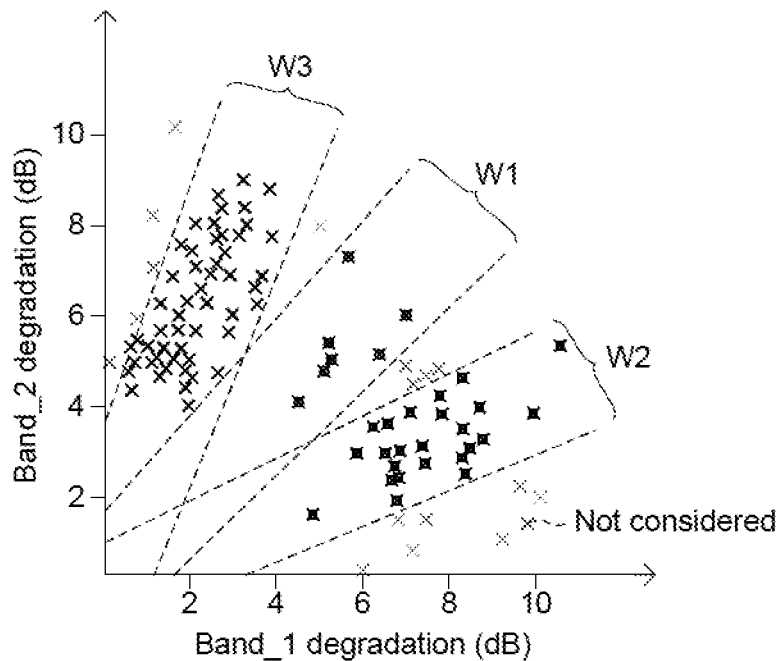

FIG. 3A (prior art) and FIG. 3B shows example without codeword filtering and with codeword filtering, respectively. As shown in FIG. 3A, without codeword filtering, the selected tuner codeword may cause serious degradation to other signal bands. For example, if the tuner codeword 310 is selected, the selected tuner codeword 310 may favor band 2 but causes series degradation to the band 1, wherein band 2 has 0 dB degrade while band 1 has almost 6 dB degrade. Similarly, if the tuner codeword 320 is selected, the selected tuner codeword 310 may favor band 1 but causes series degradation to the band 2, wherein band 1 has 0 dB degrade while band 2 has almost 4.5 dB degrade. In here, the band 1 may be one of the i-th transmission band and the i-th receiving band while the band 2 may be the other of the i-th transmission band or the i-th receiving band.

As shown in FIG. 3B, with codeword filtering of one embodiment of the application, the weighting-based filter can not only adaptively select the tuner codewords of interest, but also limit the performance degradation of each selected codeword. FIG. 3B also shows several filtering weights and filtering ranges. Filtering weight W1 is balanced (i.e. the degradation of band 1 and band 2 is balanced). Filtering weight W2 is favoring band 2, while filtering weight W3 is favoring band 1.

Figure 4:
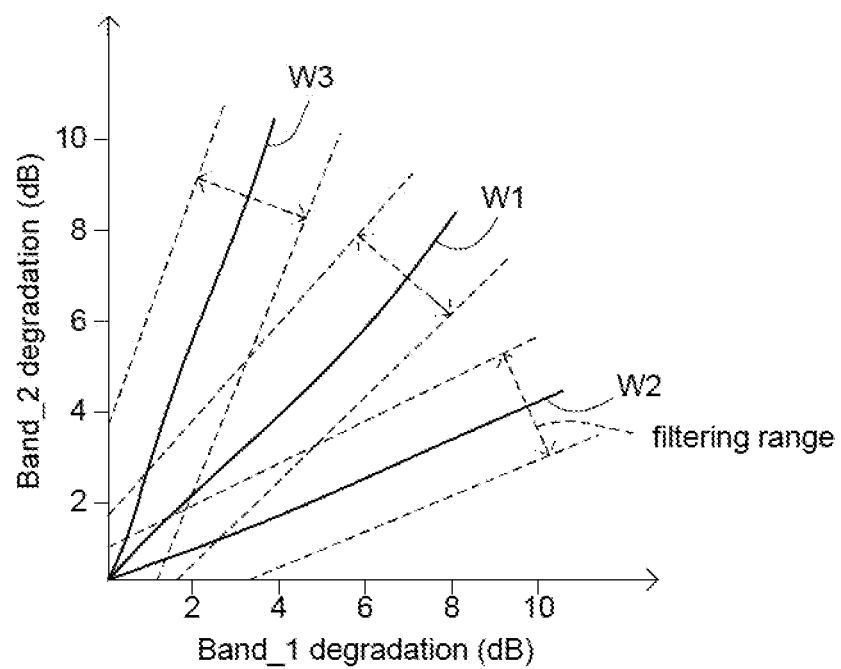
FIG. 4 also shows filtering weights and the filtering ranges according to one embodiment of the application.

FIG. 4 also shows filtering weights W1-W3 and the filtering ranges according to one embodiment of the application.

One example of cost calculation is described below, which is not to limit the application.

|     | Rx Δ | Tx Δ | Cost |
| --- | --- | --- | --- |
| CW1 | 7 | 1 | 15 |
| CW2 | 0 | 6 | 6 |
| CW3 | 5 | 4 | 14 |

In the above example, the codeword CW2 has a lowest cost and thus the codeword CW2 is selected as the target codeword and stored in the codeword database.

Figure 5A:
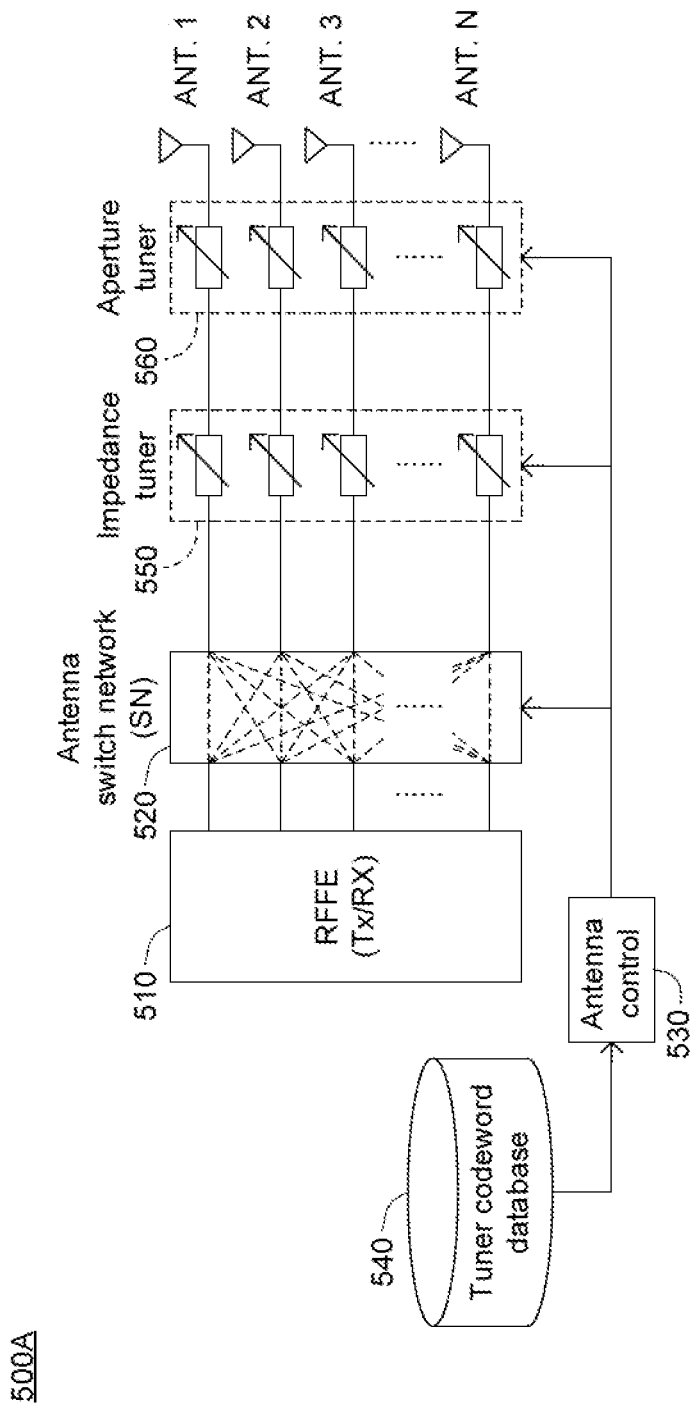
FIG. 5A to FIG. 5C show several example of a mobile device according to one embodiment of the application.
Figure 5B:
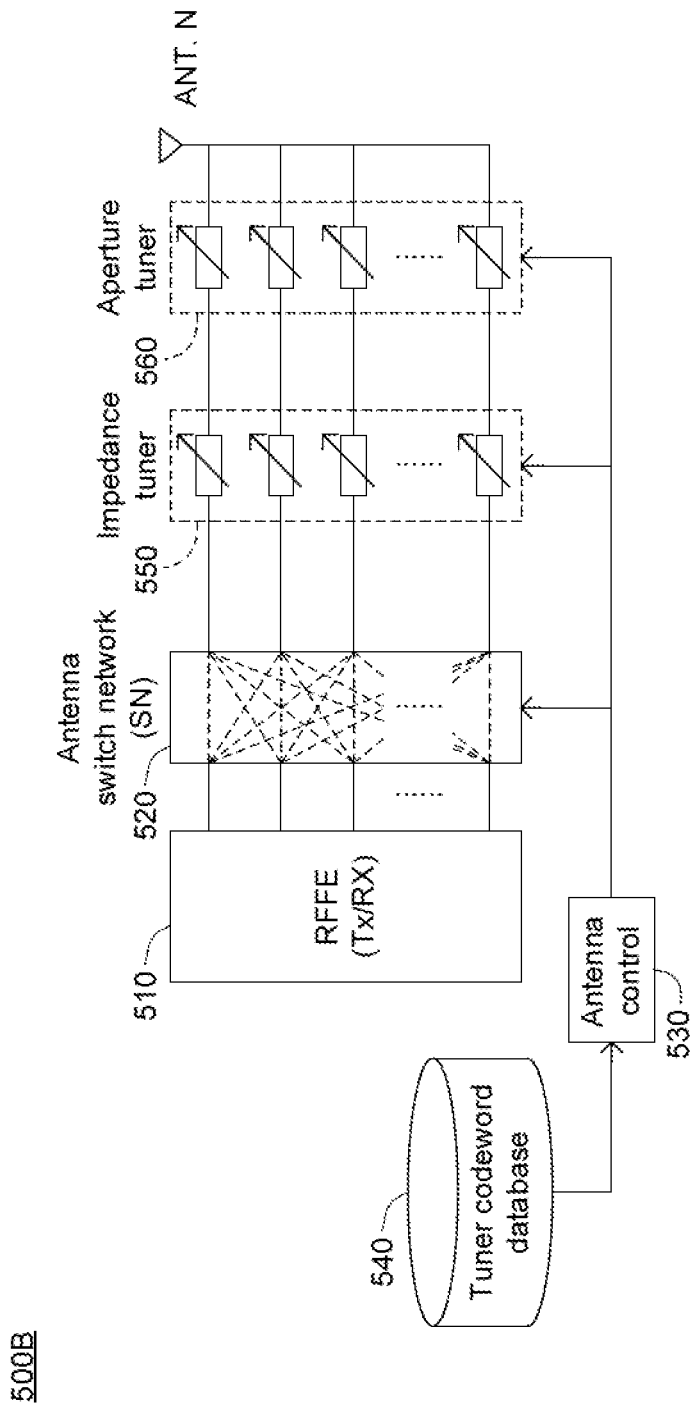
Figure 5C:
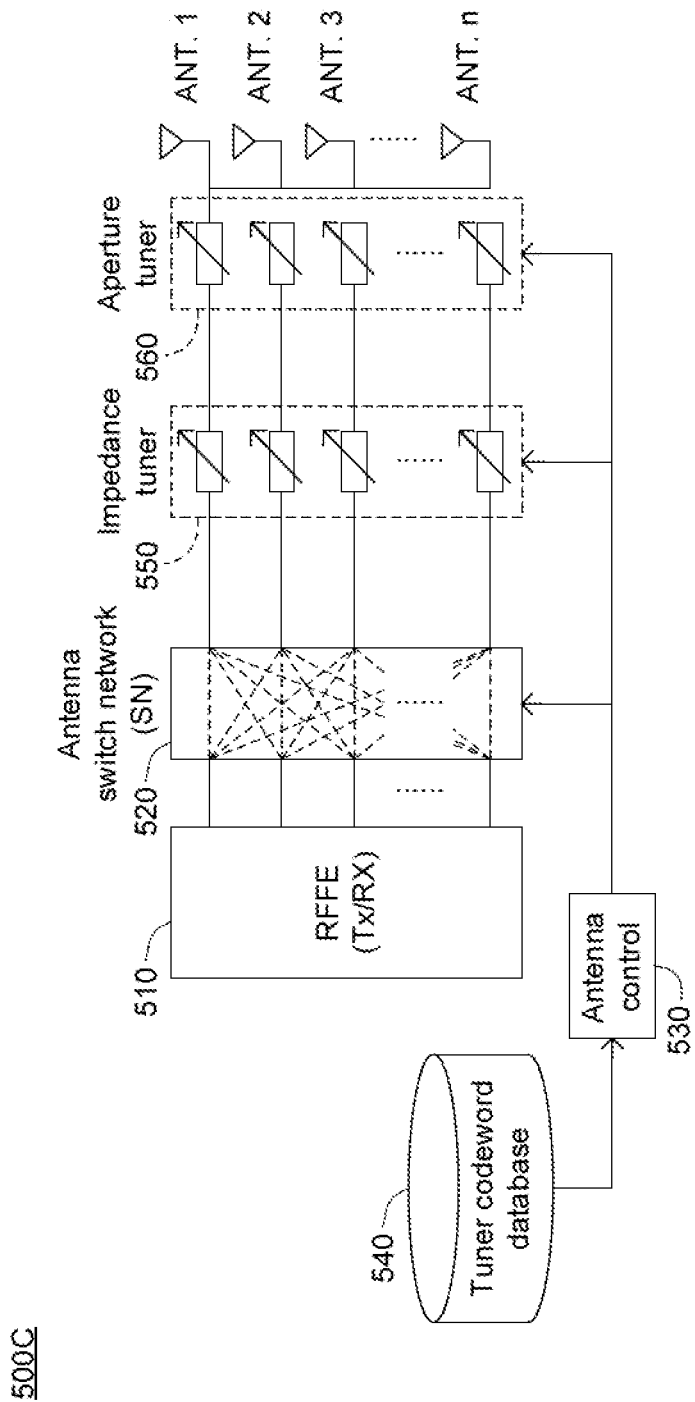

FIG. 5A to FIG. 5C show several example of a mobile device according to one embodiment of the application.

As shown in FIG. 5A, the mobile device 500A includes: a Radio frequency front-end (REFE) 510, an antenna switch network 520, an antenna control 530, a tuner codeword database 540, a plurality of first tuners 550, a plurality of second tuners 560 and a plurality of antennas ANT.1-ANT.N (N being a nature number). The plurality of first tuners 550 and the plurality of second tuners 560 may be also referred as a plurality of tuner sets.

The Radio frequency front-end 510 and the antenna switch network 520 are coupled. Details of the Radio frequency front-end 510 and the antenna switch network 520 are omitted here.

The tuner codeword database 540 stores a plurality of tuner codewords. The tuner codewords stored in the tuner codeword database 540 may be filtered and selected by the above tuner codeword database construction method.

The antenna control 530 is coupled to the antenna switch network 520, the tuner codeword database 540, the plurality of first tuners 550 and the plurality of second tuners 560. The antenna control 530 fetches at least one target codeword from the tuner codeword database 540 to control the antenna switch network 520, the plurality of first tuners 550 and the plurality of second tuners 560.

The plurality of first tuners 550 and the plurality of second tuners 560 are coupled to the plurality of antennas ANT.1-ANT.N. In one embodiment of the application, the plurality of first tuners 550 may be for example but not limited by, impedance tuners while the plurality of second tuners 560 may be for example but not limited by, aperture tuners.

In FIG. 5A, the plurality of first tuners 550, the plurality of second tuners 560 and the plurality of antennas ANT.1-ANT.N are one-to-one relationship. That is, one of the plurality of first tuners 550 and one of the plurality of second tuners 560 controls a corresponding one among the plurality of antennas ANT.1-ANT.N. In the application, a first tuner 550 and a second tuner 560 may be also referred as a tuner set. Thus, in FIG. 5A, one tuner set is coupled to or connected to a corresponding antenna.

As shown in FIG. 5B and FIG. 5C, the mobile devices 500B and 500C include the same or similar elements as the mobile device 500A. Thus, details of the mobile devices 500B and 500C are omitted.

In FIG. 5B, all the plurality of first tuners 550 and all the plurality of second tuners 560 are coupled to the same antenna ANT.N. That is, all the plurality of first tuners 550 and all the plurality of second tuners 560 control the same antenna ANT.N. In FIG. 5B, multiple or all tuner sets are coupled to or connected to a corresponding antenna.

In FIG. 5C, a single selected first tuner 550 and a single selected second tuner 560 are coupled to multiple antennas ANT.1-ANT.N. That is, the single selected first tuner 550 and the single selected second tuner 560 control multiple antennas ANT.1-ANT.N. In FIG. 5C, one single tuner set is coupled to or connected to multiple or all antennas.

In one embodiment of the application, the tuner codeword database is stored with the dimension of different antenna, antenna switch network (SN) status and multiple conditions with the corresponding threshold based on the modem (modulation-demodulation) information such as SNR, PHR, RSRP and so on.

In one embodiment of the application, the tuner codeword includes aperture tuner setting, impedance tuner setting, and even the combination of both aperture tuner and impedance tuner setting.

In one embodiment of the application, the tuner codeword of an antenna is selected according to the pre-measured characteristic (e.g., transmitted power, RSRP, VSWR measurement and so on) of each tuner codeword.

In one embodiment of the application, a computer program product and/or a non-transitory computer readable media are/is developed to implement the tuner codeword selection for all cases automatically based on the user configuration inputs.

In one embodiment of the application, the proposed tuner codeword selection method for each antenna can support multiple antenna SN status, environmental conditions and user scenarios in real-time antenna control.

In one embodiment of the application, the proposed tuner codeword selection (construction) method has high flexibility for the tuner codeword selection based on the user-defined weighting.

In one embodiment of the application, the selected tuner codeword by the proposed tuner codeword selection (construction) method can effectively enhance the performance of the favored band and prevent other bands from serious degradation.

In one embodiment of the application, the proposed tuner codeword selection method can be implemented automatically by the computer program for all the cases including multiple antenna with tuner, antenna SN status, environmental conditions and user scenarios.

In one embodiment of the application, a tuner codeword database construction methodology with tuner codeword filtering for single/multiple band CA case under multiple conditions is proposed. The tuner codeword database construction methodology includes: characteristic data collection among several mobile devices (for example, in the laboratory); the optimized tuner codeword determination utilizing the proposed tuner codeword filtering and selection algorithm; and tuner codeword database storing different antenna with tuner, antenna SN status, environmental conditions and user scenarios.

In one embodiment of the application, an adaptive tuner codeword filtering and selection algorithm based on the user-defined weightings is proposed. The adaptive tuner codeword filtering and selection algorithm includes: defining the indicator function based on the measured tuner characteristic; tuner codeword pre-processing and filtering based on the user-defined weightings; defining the determination function based on the user-defined weighting and the indicator function for selecting tuner codeword among filtered tuner codewords; and determining the optimized (target) tuner codeword based on the calculated determination function results.

In one embodiment of the application, the method for tuner codeword filtering includes: determining the filtering mechanism with pre-defined indicator function and the weighting of each CC or signal band; and determining the filtering range to filter the tuner codewords (i.e. to limit the candidates of tuner codewords). In one embodiment of the application, the weighting may represent the degree of preference for each CC or signal band; and therefore, only the tuner codewords of interest can be filtered with the desired correlation between pre-defined weightings and indicators. In one embodiment of the application, the filtering range may be adjusted according to the standard deviation, variance of the statistics and so on.

In one embodiment of the application, the antenna tuner codeword database encompasses settings for each antenna-tuner pair, each SN status, different environmental conditions (such as channel characteristics like Signal-to-noise ratio (SNR), Power headroom (PHR), Reference signal received power (RSRP), Voltage standing wave ratio (VSWR) measurements), and user scenarios, among other factors.

In summary, in one embodiment of the application, an adaptive antenna tuner codeword algorithm is proposed to optimize the tuner codeword selection based on the user-defined (predetermined) weightings for different cases. The signal bands of interest are improved with larger weighting; however, the degradation of other bands is constrained.

Also, one embodiment of the application discloses a methodology of antenna tuner codeword database construction for different conditions. The tuner codeword database may include but not limited to the settings for each antenna with tuner, for each SN status, for each environmental condition (different channel characteristic such as SNR, PHR, RSRP, VSWR measurement and so on) and for each user scenario.

The foregoing mainly describes the solutions provided in the embodiments of the application. It may be understood that, to implement the foregoing functions, the mobile device includes corresponding hardware structures and/or software modules for performing the functions. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In one embodiment of the application, the mobile device may be divided into function modules based on the foregoing examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used. An example in which each function module is obtained through division based on each corresponding function is used below for description.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A tuner codeword database construction method includes:
   collecting characteristic data among several testing mobile devices;
   determining a target tuner codeword by filtering and selecting among a plurality of tuner codes, the step of filtering and selecting among the plurality of tuner codes including:
   defining an indicator function based on the characteristic data;
   pre-processing and filtering the plurality of tuner codes based on a user-defined weighting;
   defining a determination function based on the user-defined weighting and the indicator function for selecting among a plurality of filtered tuner codewords; and
   determining the target tuner codeword based on a plurality of determination function results; and
   storing the target tuner codeword in a tuner codeword database, the tuner codeword database storing a plurality of stored tuner codewords for controlling at least one tuner of a user mobile device.

2. The method according to claim 1, wherein
   a filtering mechanism is determined with the indicator function and the user-defined weighting of each component carrier (CC) or signal band; and
   determining a filtering range to filter the tuner codewords.

3. The method according to claim 2, wherein the filtering range is adjusted according to a standard deviation or a statistics variance.

4. The method according to claim 1, wherein:
the tuner codeword database is stored with the dimension of different antenna, antenna switch network (SN) status and multiple conditions with corresponding thresholds based on modulation-demodulation information; and
the tuner codeword includes aperture tuner setting, impedance tuner setting, and combinations of both aperture tuner and impedance tuner setting.

* * * * *